(12) United States Patent
Crump

(10) Patent No.: US 9,494,275 B2
(45) Date of Patent: Nov. 15, 2016

(54) TRAILER AXLE JACK STAND

(71) Applicant: David Crump, Owasso, OK (US)

(72) Inventor: David Crump, Owasso, OK (US)

(*) Notice: Subject to any disclaimer, the term of this patent is extended or adjusted under 35 U.S.C. 154(b) by 0 days.

(21) Appl. No.: 14/610,546

(22) Filed: Jan. 30, 2015

(65) Prior Publication Data

US 2016/0223129 A1 Aug. 4, 2016

(51) Int. Cl.
*A47F 5/00* (2006.01)
*F16M 11/28* (2006.01)

(52) U.S. Cl.
CPC .................................. *F16M 11/28* (2013.01)

(58) Field of Classification Search
CPC ...................................................... F16M 11/28
USPC .............. 248/351, 354.3, 354.5, 188.5, 352, 248/354.4; 254/94, 422; D34/31
See application file for complete search history.

(56) References Cited

U.S. PATENT DOCUMENTS

| | | |
|---|---|---|
| 829,333 A | 8/1906 | Hampson |
| 1,548,326 A | 8/1924 | McDuffie |
| 1,661,882 A | 3/1928 | Derrick |
| 1,682,856 A | 9/1928 | Salkind |
| 1,805,508 A | 11/1930 | Angelillo |
| 2,001,467 A | 9/1934 | Madigan |
| 3,355,136 A * | 11/1967 | Staples ................... F16M 11/28 248/352 |
| D309,818 S | 8/1990 | Bink |
| 5,228,651 A | 7/1993 | Warner |
| D350,888 S * | 9/1994 | Perry ............................ D34/31 |
| 5,520,360 A * | 5/1996 | Wensman .............. F16M 11/24 248/188.5 |
| 6,019,337 A * | 2/2000 | Brown ...................... B60D 1/60 248/352 |
| 6,053,477 A | 4/2000 | Price |
| 8,113,479 B1 * | 2/2012 | O'Connell ............... A62B 3/00 248/351 |
| D656,289 S | 3/2012 | Crump |

* cited by examiner

*Primary Examiner* — Gwendolyn Baxter
(74) *Attorney, Agent, or Firm* — Head, Johnson & Kachigian, P.C.

(57) ABSTRACT

The trailer axle jack stand relates generally to a trailer axle jack stand for lifting a recreational vehicle, boat, trailer, military equipment, and the like, off the ground, such as for use in changing flat tires, thrown tracks or other repair of the vehicle. The jack stand includes an upstanding support member that is adjustable in height and terminates with a cradle capable of engaging an axle of the vehicle. The jack stand includes a base having a generally arcuate front portion that allows the jack stand to pivot in order to raise the vehicle.

20 Claims, 4 Drawing Sheets

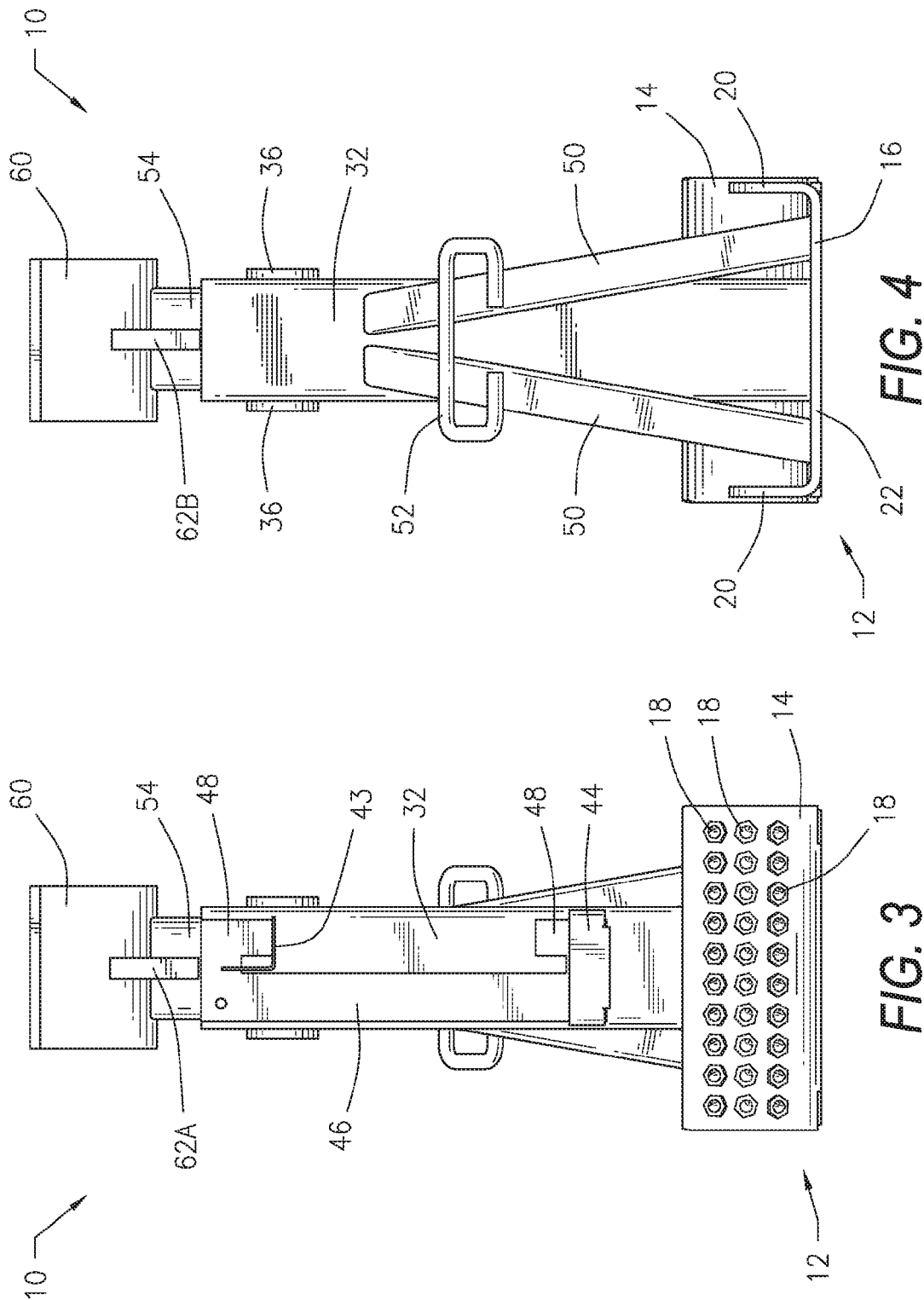

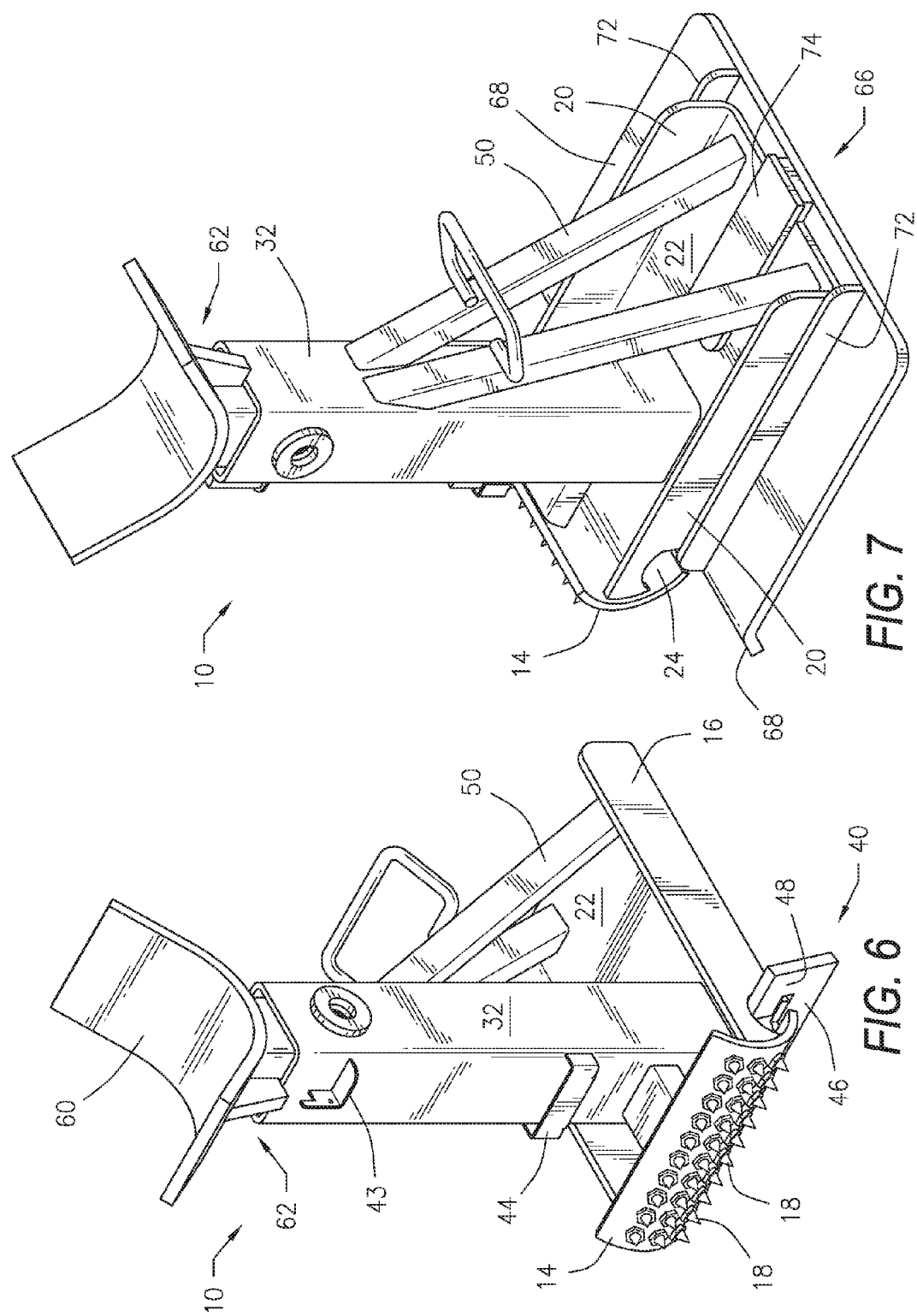

TRAILER AXLE JACK STAND

CROSS REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention.

This invention relates generally to a trailer axle jack stand, and more particularly to a combination jack and jack stand for lifting a recreational vehicle, boat, trailer, military equipment, and the like, off the ground, such as for use in changing flat tires, thrown tracks or other repair of the vehicle.

2. Description of the Related Art.

A wide variety of vehicle jacks are known in the art. Jacks are employed to lift items of substantial weight to include vehicles. In some instances, once an item is lifted it may be desired to maintain the item in the elevated position for an extended period while activity is conducted about the item. In these instances, there exists a hazard that the particular jack may lose lifting force engagement, permitting the weighty item to unexpectedly lower. This presents a particularly serious hazard to activity being conducted underneath the item. For this reason the field of art practices placing rigid supports or jack stands under items to prevent the item from lowering in case the jack loses lifting force.

While the use of jacks is known in the art, there remains a need for a trailer axle jack stand that has certain improvements to the art by providing a jack having a base plate with a rear portion and an arcuate front portion with protruding traction spikes for biting into the ground to prevent slippage.

Various other advantages and features of the invention will be apparent from the following description and from the claims.

BRIEF SUMMARY OF THE INVENTION

In general, in a first aspect, the invention relates to a trailer axle jack stand having a base plate with a generally arcuate front portion and a rear portion. The front portion of the base plate has a plurality of traction members, such as removable protruding spikes. The jack stand also has an upstanding support member connected to the rear portion of the base plate. The upstanding support member has a locking pin aperture for receipt of a locking pin. A rear support member, such as a V-shaped support member that is angled downwardly, is connected between the upstanding support member and the rear portion of the base plate. In addition, a removable upright cradle support member is telescopically received within a central bore of the upstanding support member. The upright cradle support member has a plurality of spaced pin apertures and an upper cradle.

The rear portion of the base plate may include a generally U-shaped rear portion having a pair of opposed upstanding wall sections separated by a planar base portion that is oriented generally perpendicular with the upstanding wall sections. Additionally, a prone base support member may be connected between the upstanding support member and the arcuate front portion of the base plate.

In a first aspect, the invention may include a cleat that is removably attachable to the jack stand using at least one cleat retaining member during use, and a cleat storage retainer is configured to removably attach the cleat to the jack stand during non-use. The cleat may include a generally C-shaped planar bracket having opposed stop shoulders. The cleat retaining member can include a cleat recess having a cleat lower shoulder and a generally arcuate upper shoulder. More particularly, the cleat retaining member may be a pair of opposing cleat retaining members configured to attach the removable cleat, with the stop shoulders of the cleat being received within the cleat retaining member. The cleat retaining member can include a cleat recess having a cleat lower shoulder and a generally arcuate upper shoulder. During use, the stop shoulders of the cleat engage the cleat upper shoulders and the lower shoulders. Moreover, the cleat storage retainer may include an upper generally L-shaped attachment member axially spaced and coaxially aligned with a lower attachment bracket.

In a second aspect, the invention can include a detachable, enlarged base member configured to be removably attached to the rear portion of the base plate. The enlarged base member has a surface area greater than a surface area of the rear portion of the base plate. The enlarged base member may have a main planar portion and a terminal downwardly angled portion, with the main planar portion having a pair of parallel support members and a base plate retainer positioned intermediate of the parallel support members. Furthermore, the detachable base member is configured to be slidably engaged with the rear portion of the base plate such that the rear portion is received between the base plate retainer and an upper surface of the enlarged base member and the parallel support members are aligned along and span the rear portion of the base plate.

BRIEF DESCRIPTION OF THE DRAWINGS

FIG. 3 is a front elevation view of the jack stand shown in FIG. 1;

FIG. 4 is a rear elevation view of the jack stand shown in FIG. 1;

FIG. 6 is a front perspective view of an example of a trailer axle jack stand having a removable cleat in accordance with an illustrative embodiment of the invention disclosed herein; and FIG. 7 is a rear perspective view of another example of a trailer axle jack stand having a detachable, enlarged base member in accordance with an illustrative embodiment of the invention disclosed herein.

DETAILED DESCRIPTION OF THE INVENTION

Figures 1, 2:
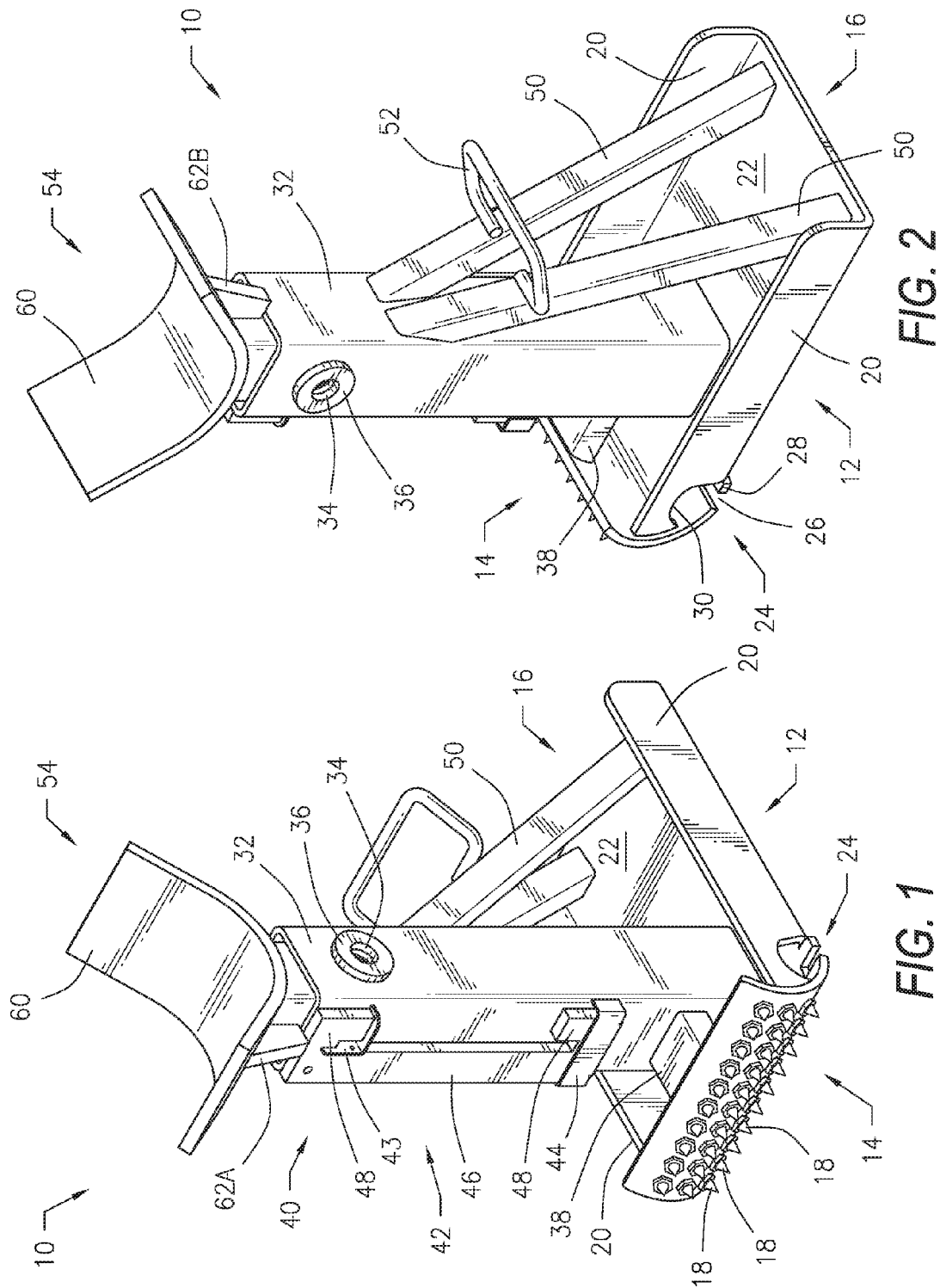
FIG. 1 is a front perspective view of an example of a trailer axle jack stand in accordance with an illustrative embodiment of the invention disclosed herein.
FIG. 2 is a rear perspective view of the jack stand shown in FIG. 1.

The devices and processes discussed herein are merely illustrative of specific manners in which to make and use this invention and are not to be interpreted as limiting in scope.

While the invention has been described with a certain degree of particularity, it is to be noted that many modifications may be made in the details of the construction and the arrangement of the elements and components of the devices and/or in the sequences and steps of the processes without departing from the scope of this disclosure. It is understood that the devices and processes are not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the process to be operated in a particular orientation. Terms, such as "connected," "connecting," "attached," "attaching," "join" and "joining" are used interchangeably and refer to one structure or surface being secured to another structure or surface or integrally fabricated in one piece.

Referring to the figures of the drawings, wherein like numerals of reference designate like elements throughout the several views, a trailer axle jack stand 10 is constructed of a base plate 12 having a generally arcuate front portion 14 and a generally U-shaped rear portion 16. The arcuate front portion 14 of the base plate 12 includes a plurality of traction members 18, and for example as exemplified, the traction members 18 may be removable spikes. The U-shaped rear portion 16 of the base plate 12 includes a pair of opposed upstanding wall sections 20 separated by a planar base portion 22 that is oriented generally perpendicular with the upstanding wall sections 20. Intermediate of the front portion 14 and the rear portion 16 of the base plate 12 is a pair of opposing cleat retaining members 24. Each of the cleat retaining members 24 includes a cleat recess 26 having a cleat lower shoulder 28 and a generally arcuate upper shoulder 30.

An upstanding support member 32 is connected to the base plate 12 of the jack stand 10. As illustrated in the figures, the upstanding support member 32 is a tubular member connected along a centerline of the planar base portion 22 of the U-shaped rear portion 16. An upper end of the upstanding support member 32 includes a locking pin aperture 34 enforced with a pin aperture support 36. In addition, a prone base support member 38 is connected between the upstanding support member 32 and the arcuate front portion 14 of the base plate 12.

Figure 5:
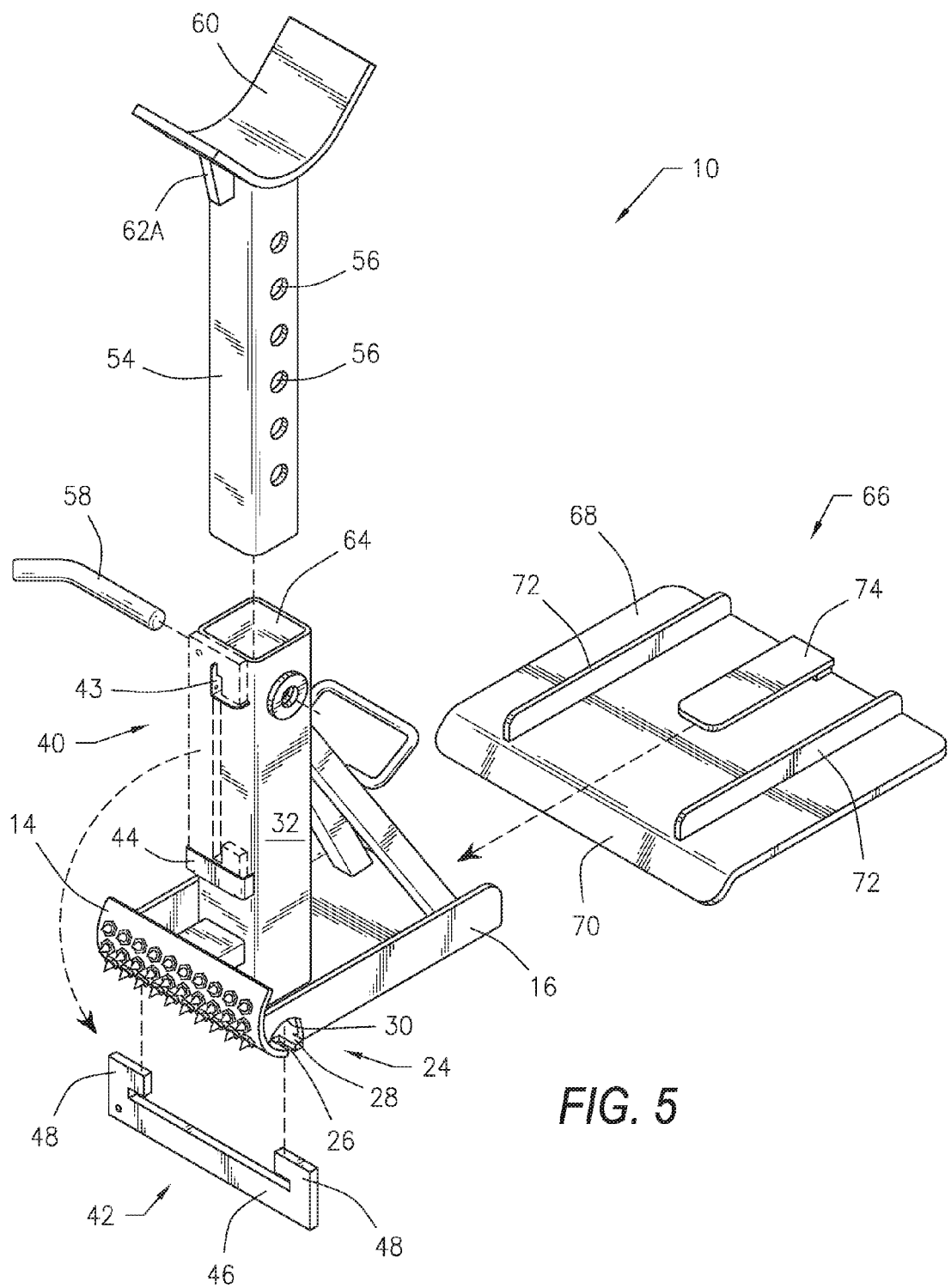
FIG. 5 is an exploded perspective view of another example of a trailer axle jack stand in accordance with an illustrative embodiment of the invention disclosed herein.

The upstanding support member 32 may include a cleat retainer 40 for removably attaching a cleat 42 to the jack stand 10, as shown in FIGS. 1 through 9. The cleat retainer 40 may include an upper generally L-shaped attachment member 43 that is axially spaced and coaxially aligned with a lower attachment bracket 44 along the upstanding support member 32. The cleat 42 may be constructed as a generally C-shaped planar bracket 46 having opposed stop shoulders 48. As illustrated in FIG. 6, the cleat retaining members 24 are capable of receiving the removable cleat 40, such as for use in sandy or muddy conditions. During use, the stop shoulders 48 of the cleat 42 are received within the cleat recesses 26 and engage the cleat upper shoulders 30 and the lower shoulders 28.

Moreover, at least one rear angled support member 50 is connected between the upstanding support member 32 and the U-shaped rear portion 16 of the base plate 12. As illustrated, the rear angled support member 50 is a V-shaped, angled support members that are angled downwardly from the upstanding support member 32 to the base plate 12. A handle 52 may be attached to the angled support members 50.

A removable upright cradle support member 54 is telescopically received within a central bore 64 of the upstanding support member 32. The upright cradle support member 54 includes a plurality of spaced pin apertures 56 capable of receiving a locking pin 58 when the locking pin 58 is passed through the locking pin aperture 34 of the upstanding support member 32. The upright cradle support member 54 also includes an upper cradle 60 attached to the cradle support member 54, and may be reinforced with at least one gusset 62. As illustrated, a front gusset 62A and a rear gusset 62B are respectively attached to opposed sides of the cradle 60 and the upright cradle support member 54.

Referring now to FIG. 7, the jack stand 10 may also include a detachable, enlarged base member 66 capable of being removably attached to the rear portion 16 of the base plate 12. The enlarged base member 66 has a larger surface area than the rear portion 16 of the base plate 12 for providing additional stability and/or rigidity to the jack stand 10 during use. The enlarged base member 66 may include a main planar portion 68 and a terminal downwardly angled portion 70. A pair of parallel support members 72 may be attached to an upper surface of the main planar portion 68 of the enlarged base member 66. The upper surface of the enlarged base member also may include a base plate retainer 74 positioned intermediate of the parallel support members 72. During usage, the detachable base member 66 is slidably engaged with the U-shaped rear portion 16 of the base plate 12, and in particular, the planar base portion 22 of the U-shaped rear portion 16 is received between the base plate retainer 74 and the upper surface of the enlarged base member 66. The parallel support members 72 are aligned along and span the upstanding wall sections 20 of the base plate 12.

Whereas, the devices and processes have been described in relation to the drawings and claims, it should be understood that other and further modifications, apart from those shown or suggested herein, may be made within the scope of the invention.

What is claimed is:

1. A trailer axle jack stand, comprising:
   a base plate comprising a generally arcuate front portion and a rear portion; said front portion having a plurality of traction members;

an upstanding support member connected to said base plate; said upstanding support member having a locking pin aperture;

a cleat removably attachable to said jack stand using at least one cleat retaining member during use;

a cleat storage retainer configured to removably attach said cleat to said jack stand during non-use;

a rear support member connected between said upstanding support member and said rear portion of said base plate;

a removable upright cradle support member telescopically received within a central bore of said upstanding support member; said upright cradle support member having a plurality of spaced pin apertures and an upper cradle.

2. The trailer axle jack stand of claim 1 wherein said rear portion of said base plate further comprises a generally U-shaped rear portion having a pair of opposed upstanding wall sections separated by a planar base portion that is oriented generally perpendicular with the upstanding wall sections.

3. The trailer axle jack stand of claim 1 wherein said traction members comprise removable protruding spikes.

4. The trailer axle jack stand of claim 1 wherein said cleat retaining member comprises a cleat recess having a cleat lower shoulder and a generally arcuate upper shoulder.

5. The trailer axle jack stand of claim 1 further comprising a prone base support member connected between said upstanding support member and said arcuate front portion of said base plate.

6. The trailer axle jack stand of claim 1 wherein said cleat storage retainer comprises an upper generally L-shaped attachment member axially spaced and coaxially aligned with a lower attachment bracket.

7. The trailer axle jack stand of claim 1 wherein said cleat comprises a generally C-shaped planar bracket having opposed stop shoulders.

8. The trailer axle jack stand of claim 7 wherein said cleat retaining member is a pair of opposing cleat retaining members configured to attach said removable cleat, wherein stop shoulders of said cleat are received within said cleat retaining member; wherein said cleat retaining member further comprises a cleat recess having a cleat lower shoulder and a generally arcuate upper shoulder; and wherein said stop shoulders of said cleat engage said cleat upper shoulders and said lower shoulders.

9. The trailer axle jack stand of claim 1 wherein said rear support member is a V-shaped support member that is angled downwardly from said upstanding support member to said base plate.

10. The trailer axle jack stand of claim 1 further comprising a detachable, enlarged base member configured to be removably attached to said rear portion of said base plate; and wherein said enlarged base member has a surface area greater than a surface area of said rear portion of said base plate.

11. The trailer axle jack stand of claim 10 said enlarged base member further comprising a main planar portion and a terminal downwardly angled portion; and wherein said main planar portion comprises a pair of parallel support members and a base plate retainer positioned intermediate of said parallel support members.

12. The trailer axle jack stand of claim 11 wherein said detachable base member is configured to be slidably engaged with said rear portion of said base plate such that said rear portion is received between said base plate retainer and an upper surface of said enlarged base member and said parallel support members are aligned along and span said rear portion of said base plate.

13. A trailer axle jack stand, comprising:

a base plate comprising a generally arcuate front portion and a rear portion; said front portion having a plurality of traction members;

an upstanding support member connected to said base plate; said upstanding support member having a locking pin aperture;

a rear support member connected between said upstanding support member and said rear portion of said base plate;

a removable upright cradle support member telescopically received within a central bore of said upstanding support member; said upright cradle support member having a plurality of spaced pin apertures and an upper cradle; and a detachable, enlarged base member configured to be removably attached to said rear portion of said base plate; said enlarged base member further comprises a planar portion and a terminal downwardly angled portion; and wherein said enlarged base member has a surface area greater than a surface area of said rear portion of said base plate.

14. The trailer axle jack stand of claim 13 wherein said rear portion of said base plate further comprises a generally U-shaped rear portion having a pair of opposed upstanding wall sections separated by a planar base portion that is oriented generally perpendicular with the upstanding wall sections.

15. The trailer axle jack stand of claim 13 further comprising a prone base support member connected between said upstanding support member and said arcuate front portion of said base plate.

16. The trailer axle jack stand of claim 13 further comprising a cleat removably attachable to said jack stand using at least one cleat retaining member.

17. The trailer axle jack stand of claim 16 wherein said cleat comprises a generally C-shaped planar bracket having opposed stop shoulders; and wherein said cleat retaining member comprises a cleat recess having a cleat lower shoulder and a generally arcuate upper shoulder.

18. The trailer axle jack stand of claim 16 further comprising a cleat storage retainer configured to removably attach said cleat to said jack stand during non-use; and wherein said cleat storage retainer comprises an upper generally L-shaped attachment member axially spaced and coaxially aligned with a lower attachment bracket.

19. The trailer axle jack stand of claim 13 wherein said planar portion comprises a pair of parallel support members and a base plate retainer positioned intermediate of said parallel support members.

20. The trailer axle jack stand of claim 13 wherein said detachable base member is configured to be slidably engaged with said rear portion of said base plate such that said rear portion is received between said base plate retainer and an upper surface of said enlarged base member and said parallel support members are aligned along and span said rear portion of said base plate.

* * * * *